(12) United States Patent
West

(10) Patent No.: US 11,905,025 B2
(45) Date of Patent: Feb. 20, 2024

(54) MOUNTING SYSTEM FOR AIRCRAFT ENGINE

(71) Applicant: Spirit AeroSystems, Inc., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/748,206

(22) Filed: May 19, 2022

(65) Prior Publication Data

US 2022/0274712 A1    Sep. 1, 2022

Related U.S. Application Data

(63) Continuation of application No. 16/561,176, filed on Sep. 5, 2019, now abandoned.

(51) Int. Cl.
*B64D 27/26* (2006.01)
*B64D 27/18* (2006.01)

(52) U.S. Cl.
CPC .............. *B64D 27/26* (2013.01); *B64D 27/18* (2013.01); *B64D 2027/266* (2013.01); *B64D 2027/268* (2013.01)

(58) Field of Classification Search
CPC .............. B64D 27/26; B64D 2027/262; B64D 2027/266; B64D 2027/268
See application file for complete search history.

(56) References Cited

U.S. PATENT DOCUMENTS

| 5,226,288 | A | * | 7/1993 | Cornax | F02C 7/20 60/797 |
| 6,398,161 | B1 | * | 6/2002 | Jule | B64D 27/18 244/54 |
| 2008/0216483 | A1 | * | 9/2008 | Diochon | B64D 27/26 244/54 |
| 2010/0148012 | A1 | * | 6/2010 | McDonough | B64D 29/00 244/53 B |
| 2010/0155525 | A1 | * | 6/2010 | Stuart | B64D 27/26 244/54 |
| 2011/0064343 | A1 | * | 3/2011 | Larrochelle | F16C 35/02 384/206 |
| 2013/0302157 | A1 | * | 11/2013 | Sandy | F02C 7/20 415/213.1 |

* cited by examiner

*Primary Examiner* — Philip J Bonzell
*Assistant Examiner* — Eric Acosta
(74) *Attorney, Agent, or Firm* — Hovey Williams LLP

(57) ABSTRACT

A system for mounting an engine on an aircraft. The system includes a lower forward element, lateral linkages, an upper forward element, and an aft element. The lower forward element couples a forward portion of an engine core with a lower forward portion of a pylon. The linkages extend laterally between the lower forward element and the forward portion of the engine core. The upper forward element couples an outer portion of the fan case with an upper portion of the pylon. The aft element is spaced aftwardly apart from the lower and upper forward elements, and couples an aft portion of the engine core to an aft portion of the pylon. The system reacts all major moments acting on the engine, and the system does not extend beyond an outer periphery of the fan case, which eliminates the need for or minimizes the height of an aerodynamic fairing.

20 Claims, 16 Drawing Sheets

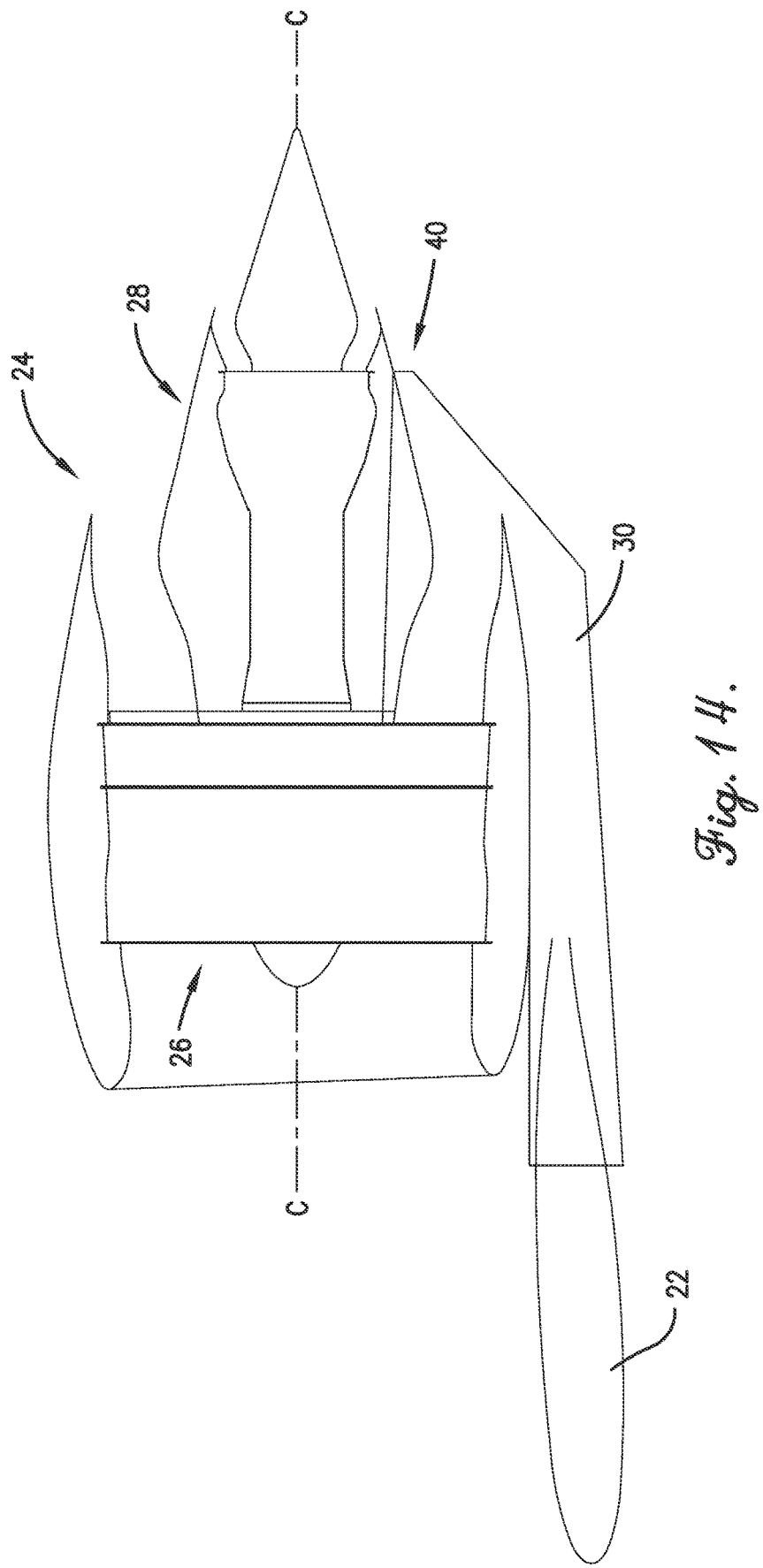

MOUNTING SYSTEM FOR AIRCRAFT ENGINE

RELATED APPLICATIONS

The present U.S. non-provisional patent application is a continuation and claims priority benefit of an earlier filed U.S. non-provisional patent application with the same title, Ser. No. 16/561,176, filed Sep. 5, 2019. The entire content of the identified earlier-filed application is incorporated by reference as though fully set forth herein.

FIELD

The present invention relates to mounting systems for engines for aerospace vehicles, and more particularly, embodiments concern a mounting system for mounting a turbofan or other engine on an aircraft or other aerospace vehicle.

BACKGROUND

Engines are often mounted on a wing or other structure of an aircraft, and are often supported by an intermediate pylon. Prior art mounting solutions rely, at least in part, on connections between the pylon and an engine fan case. The pylon resides above the fan case and extends forward of an aft edge of the fan case, which leads to an increase in the height of an aerodynamic fairing needed to blend the engine nacelle with the pylon. Further, multiple connections may be provided between the engine and the pylon in order to stabilize the fan case with respect to a centerline axis of the engine, which complicates procedures for installing and removing the engine.

Prior art solutions rely on established paths dictated by existing engine "wheel and spoke" fan case architectures. As a result, they require mounts that are located "above" (i.e., spaced apart in a radial plane passing through the centerline axis of the engine) and, in most cases, laterally displaced from a centerline plane of the engine. Some prior art solutions address in some way bending relative to the centerline axis of the engine within a vertical plane (xz) passing through the centerline axis, some address moments about a vertical axis (z), and some address engine torque (about the centerline axis) near the source (i.e., the fan). However, no prior art solution allows the reaction of moments about all three axes (x, y, and z) and the reaction of vertical, side, and fore-aft applied forces while maintaining the upper surface of the pylon structure near or below the highest elevation of the engine fan case so as to eliminate the need for or minimize the height of the aerodynamic fairing.

This background discussion is intended to provide information related to the present invention which is not necessarily prior art.

SUMMARY

Embodiments address the above-described and other problems and limitations in the prior art by providing a mounting system for mounting a turbofan or other engine on an aircraft or other aerospace vehicle. Embodiments may provide a number of advantages over the prior art, including that the mounting system reacts all major moments acting on the engine, including bending relative to a centerline axis of the engine within a vertical plane (xz) passing through the centerline axis; moments about a vertical axis (z); engine torque (about the centerline axis) near the source; and vertical, side, and fore-aft applied forces. Further, the mounting system does not extend beyond an outer periphery of the engine fan case, which allows the upper surface of the pylon to remain at or within the outer periphery, which eliminates the need for or minimizes the height of an aerodynamic fairing which blends the engine nacelle with the pylon.

In an embodiment, a mounting system is provided for mounting an engine on an aerospace vehicle, the engine including a fan case having an outer portion and an outer periphery and an engine core arranged along a centerline axis, and the aerospace vehicle including a pylon. The mounting system may include a lower forward element, one or more lateral linkages, an upper forward element, and an aft element. The lower forward element may couple a forward portion of the engine core with a lower forward portion of the pylon. The lateral linkages may extend laterally between the lower forward element and the forward portion of the engine core. The upper forward element may be spaced laterally apart from the lower forward element, and may couple the outer portion of the fan case with an upper portion of the pylon. The aft element may be spaced aftwardly apart from the lower and upper forward elements, and may couple an aft portion of the engine core to an aft portion of the pylon. The mounting system does not extend beyond the outer periphery of the fan case.

Various implementations of the foregoing embodiment may include any one or more of the following features. The lower forward element may resist a vertical loading (Fz), a lateral loading (Fy), and a thrust force (Fx) during operation of the engine, and may limit a side-to-side (yaw) deflection of the fan case with respect to the engine core during operation of the engine. The lateral linkages may limit a deflection about a vertical axis (z) of the fan case and resist a thrust force (Fx) during operation of the engine. The upper forward element may resist a pitching moment (My) and an engine torque (Mx) during operation of the engine, and may accommodate a thermal expansion during operation of the engine. The aft element may resist a vertical loading (Fz), a lateral loading (Fy), and a torque (Mx) and may accommodate a thermal expansion during operation of the engine. The upper forward element may include a spherical bearing and a shear pin slidably received within the spherical bearing.

The lower forward element may include a ring structure encircling the forward portion of the engine core and independently supporting the fan case and engine core. The lower forward element may resist an engine torque (Mx) during operation of the engine. The lateral linkages may limit a side-to-side (yaw) deflection of the fan case with respect to the engine core during operation of the engine.

The fan case may include one or more mounting lugs, and the lower forward element may include a support beam connected to the mounting lugs and having a forward interface including a spherical bearing movably engaging the fan case, with the mounting lugs resisting a lateral loading (Fy), and the support beam resisting a vertical loading (Fz), an engine torque (Mx), and a thrust force (Fx) during operation of the engine.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 14 is a side elevation view of the mounting system adapted to couple the engine with the aircraft or other aerospace vehicle aft and above the wing or other support structure.

Figure 1:
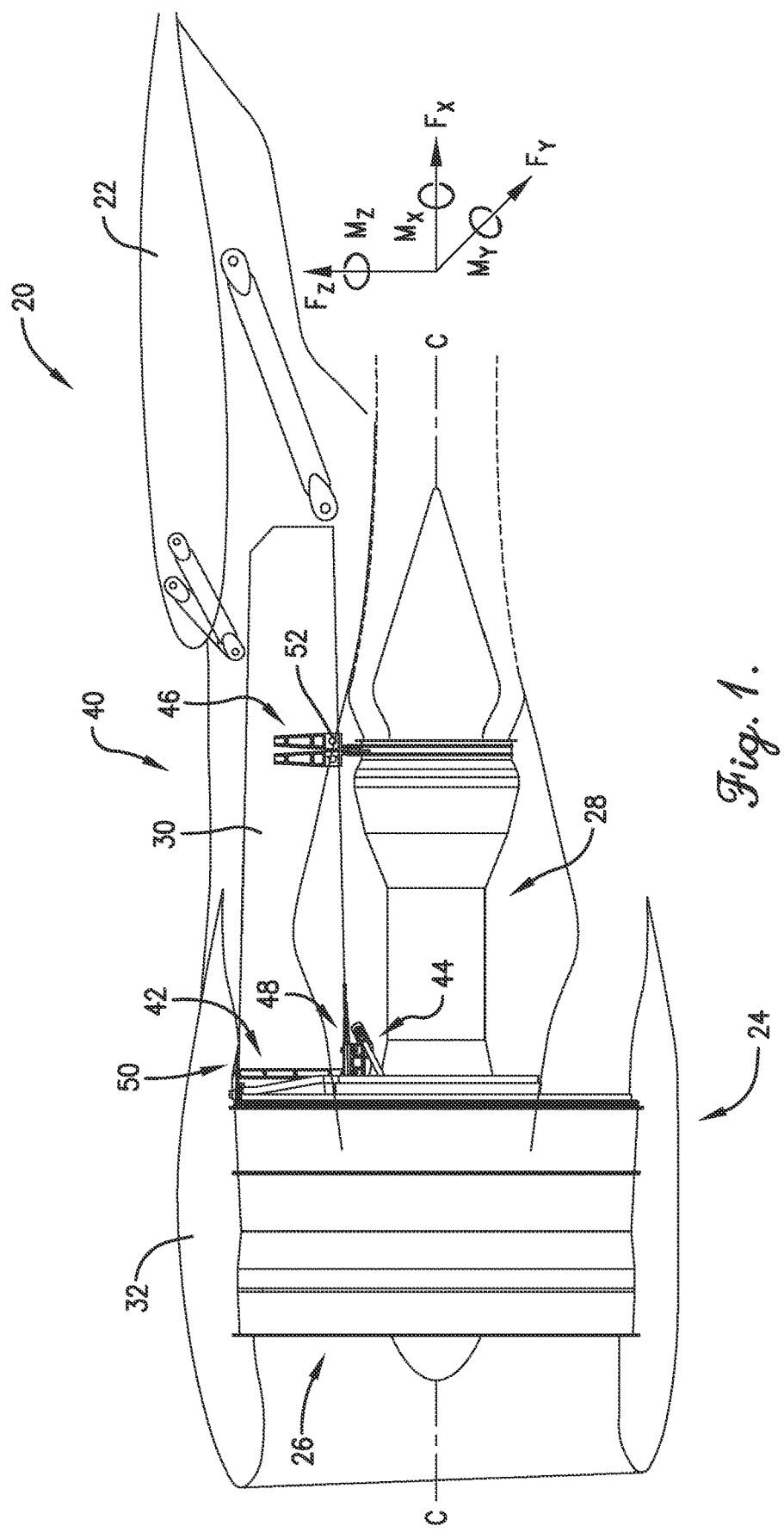
FIG. 1 is a cross-sectional side elevation view of a first embodiment of a mounting system for an engine of an aircraft or other aerospace vehicle.
Figure 2B:
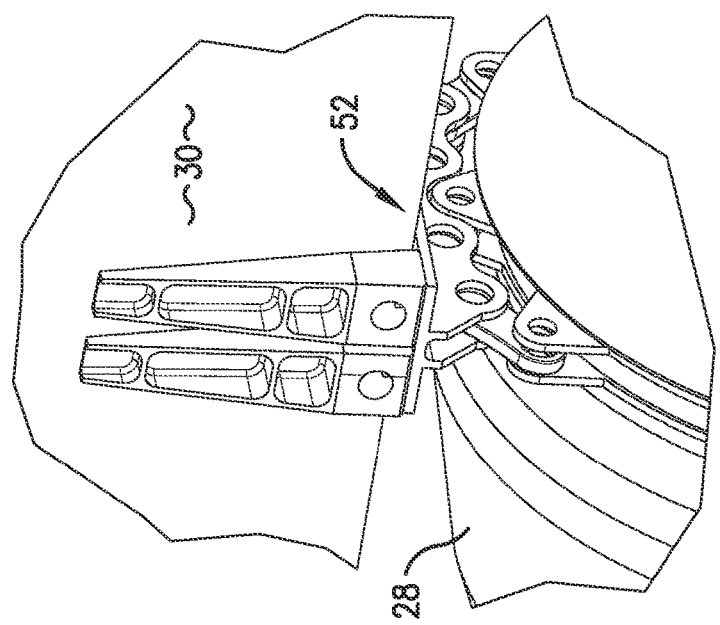
FIG. 2B is a fragmentary isometric view of an aft engine mounting subsystem of the system of FIG. 1.
Figure 2A:
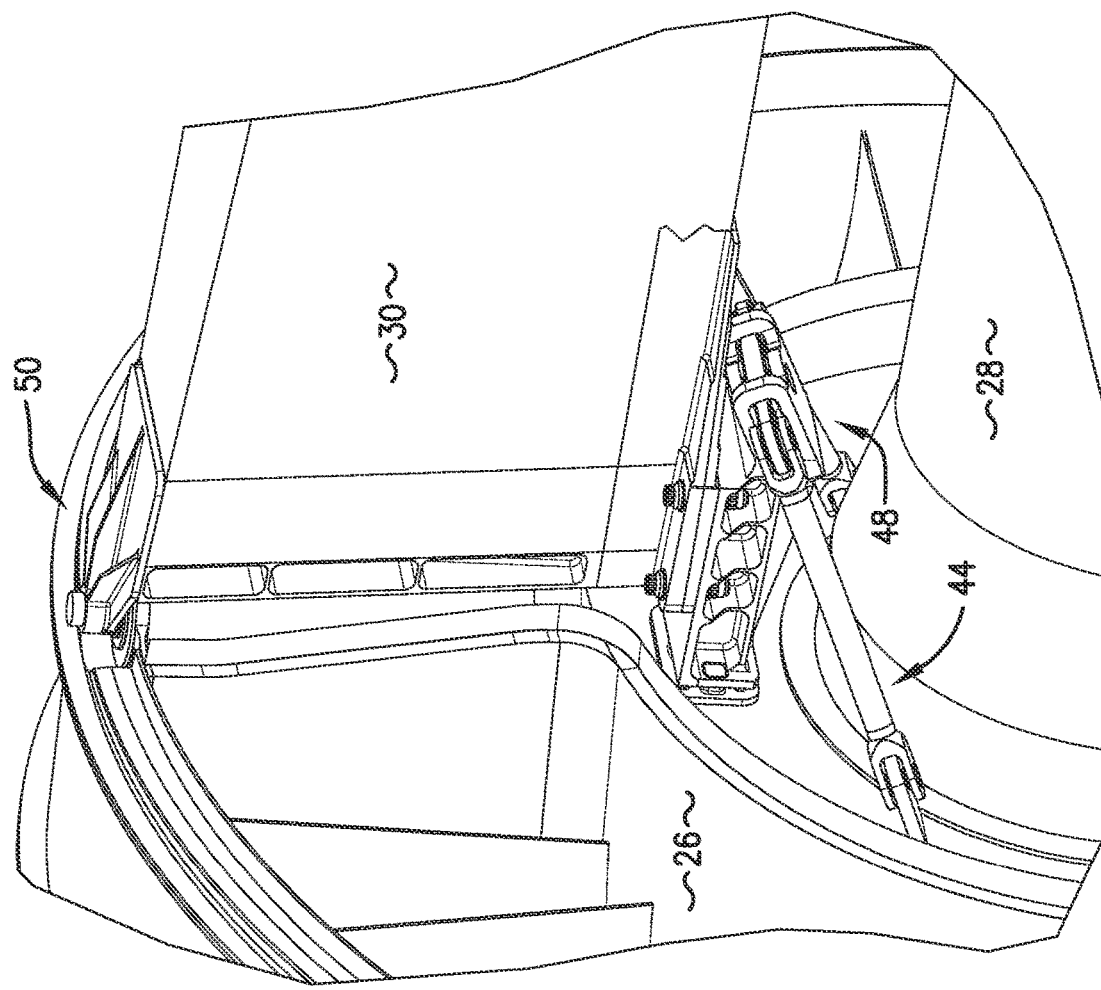
FIG. 2A is a fragmentary isometric view of a forward engine mounting subsystem of the system of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a mounting system for mounting a turbofan or other engine on an aircraft or other aerospace vehicle, wherein a forward engine mounting subsystem may be configured to stabilize a fan case assembly, transmit thrust into a pylon, and resist a majority of forces results from engine torque, and an aft engine mounting subsystem may be configured to stabilize an engine core assembly and accommodate thermal expansion. Embodiments may provide a number of advantages over the prior art, including that the forward and aft subsystems may cooperate to react all major moments acting on the engine, including bending relative to the centerline axis of the engine within a vertical plane (xz) passing through the centerline axis; moments about a vertical axis (z); engine torque (about the centerline axis) near the source (i.e., the fan); and vertical, side, and fore-aft applied forces. Further, the mounting system does not extend beyond an outer periphery of the fan case, which allows the upper surface of the pylon to remain at or within the outer periphery of the fan case, which eliminates the need for or minimizes the height of an aerodynamic fairing which blends the engine nacelle with the pylon.

More specifically, engine thrust may be reacted into the pylon near the forward lower surfaces. A coupled resistive force with a reaction mechanism may be located near the engine core and outer edge of the fan case, wherein the coupled force may be configured to counteract pitching (My), yawing (Mz), and rolling (Mx) movements of the fan case with respect to the centerline axis C of the engine. Because the mounting system does not extend outside the outer periphery of the fan case, the engine can be positioned closer to the wing or other support structure and thereby reduce or eliminate the need for the fairing. Further, bending of the engine "back-bone" may be reduced, thereby improving internal clearances and, in turn, improving fuel-burn performance. As a result of the forward mounting subsystem being configured to react the majority of the torque produced by the engine (principally resulting from the fan module), the aft mounting subsystem may be designed and constructed to be relatively simpler and lighter, thereby reducing cost and weight. The forward mounting subsystem may not require the pylon to extend above the fan case in order to attach and support the engine, thereby freeing this space to route systems and reduce the pylon upper fairing height, thereby reducing drag and weight. In engine installations requiring systems (e.g., wiring, plumbing) to be routed from the pylon to areas near the engine core, the closer proximity of the pylon structural arrangement may greatly reduce the need for additional support structures for these systems, thereby reducing cost and weight.

For the purpose of description, embodiments of the present invention are described herein in the example context of a turbofan engine on an aircraft, but it will be appreciated that the present invention is not limited to turbofan engines or aircraft and may be adapted for use with other types of engines (e.g., electric powered ducted fans) and other types of aerospace vehicles.

Referring to FIGS. 1-4, an aircraft or other aerospace vehicle 20 may include a wing or other support structure 22, an engine 24 including a fan case 26 and an engine core 28, and a pylon 30 extending between the engine 24 and the wing or other support structure 22 of the vehicle 20. The engine 24, may be, for example, an ultra-high bypass ratio turbofan engine, and may be housed within a nacelle or other enclosure 32.

References to the axes longitudinal (x or C), lateral (y), and vertical (z) are with respect to the key shown in FIG. 1. Further, forces or loadings are denoted by the symbol "F," and moments are denoted by the symbol "M." For example, a loading along the vertical axis (z) is denoted by "Fz," while a yawing moment about the vertical axis (z) is denoted by "Mz."

A first embodiment of a mounting system 40 may be configured to support reactions at forward and aft locations and stabilize the fan case 26 of the engine 24 with respect to a centerline axis C of the engine 24, as well as to reduce an overall aerodynamic drag of the enclosure 32. The mounting system 40 may include a forward engine mounting subsystem 42, one or more lateral linkage elements 44, and an aft engine mounting subsystem 46. The forward engine mounting subsystem 42 may be configured to stabilize the fan case assembly 26, transmit thrust into the pylon 30, and resist one or more forces resulting from engine torque. The aft engine mounting subsystem 44 may be configured to stabilize the engine core assembly 24 and accommodate thermal expansion. In one implementation, the forward engine mounting subsystem 42 may include a lower forward element 48 and an upper forward element 50, and the aft engine mounting subsystem 46 may include an aft element 52.

Figure 3A:
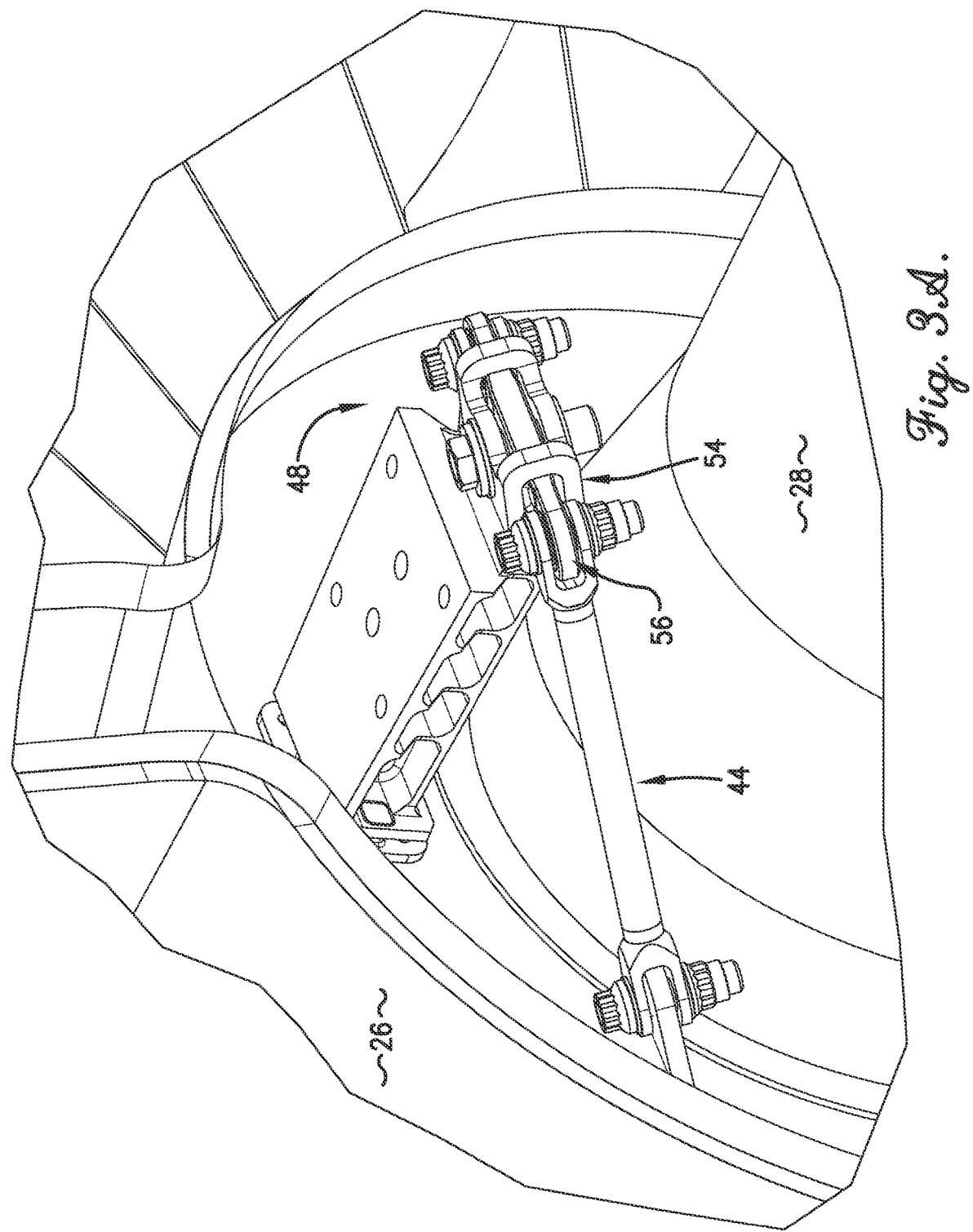
FIG. 3A is a fragmentary isometric view of a lower forward mounting element and a lateral linkage element of the forward engine mounting subsystem of FIG. 2A.
Figure 3B:
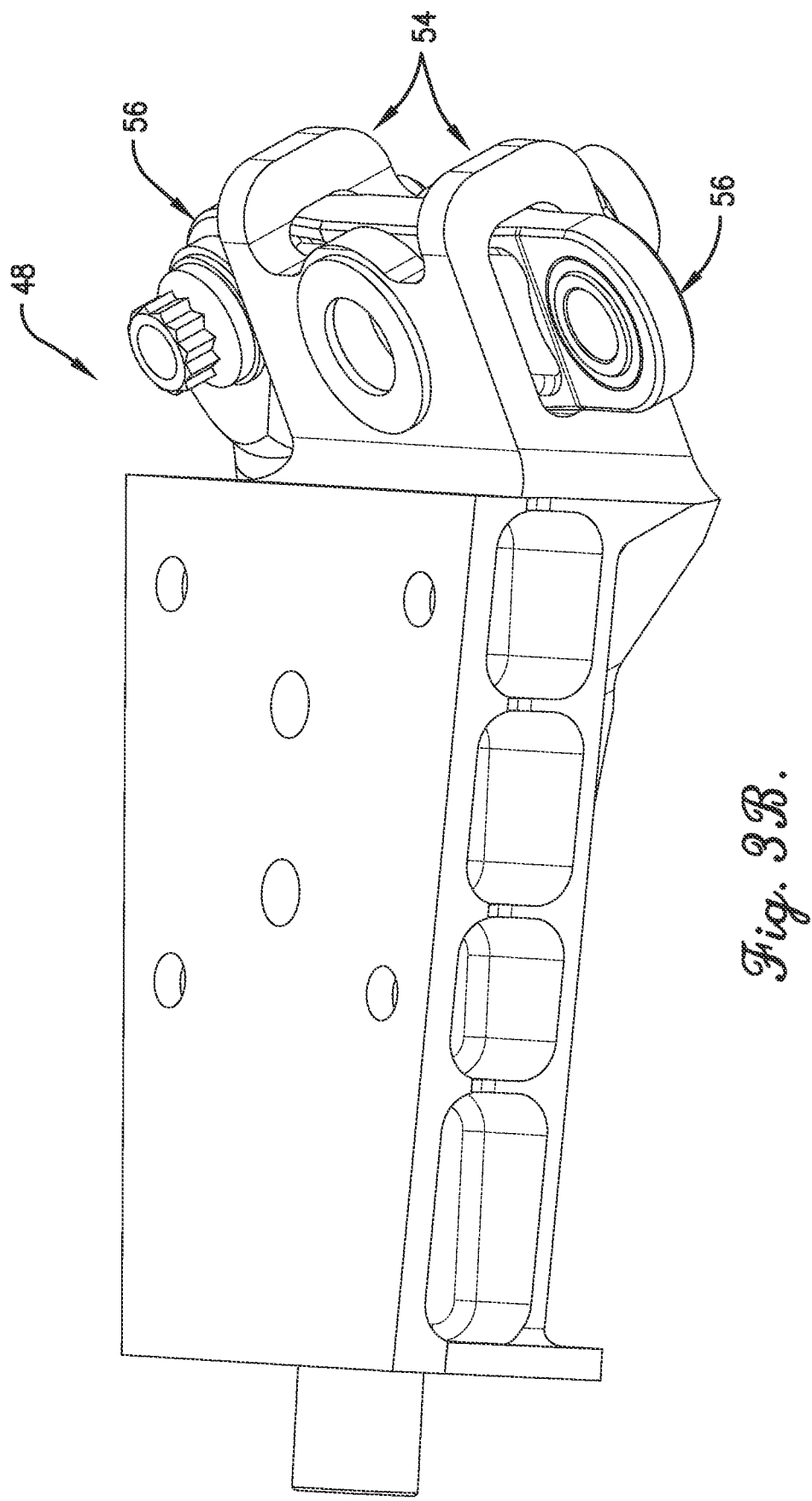
FIG. 3B is a perspective view of the lower forward mounting element of FIG. 3A.

The lower forward element 48 may provide a lower forward connection with the engine core 28 and be configured to resist vertical (Fz) and lateral (Fy) loading and may include additional features to resist the thrust forces (Fx) of the engine 24 and to prevent or limit side-to-side (yaw) deflections of the fan case 26 with respect to the engine core 28. As seen in FIG. 3, the lower forward element 48 may include one or more catchers 54 and a thrust bar 56, wherein the thrust bar 56 is configured to be physically connected by the one or more lateral linkages 44 (e.g., left and right lateral linkages) to the engine core 28. In operation, contact between the catchers 54 and the thrust bar 56 may limit deflections of the fan case assembly 26 about the vertical axis (z). The upper forward element 50 may provide an upper forward connection between the pylon 30 and the engine 24 and be configured to resist pitching moments (My) and engine torque (Mx). The upper forward element 50 may also be configured to allow for thermal expansion due to engine operation. The aft element 52 may provide an aft connection between the pylon 30 and the engine core 28 and be configured to resist vertical (Fz) and lateral (Fy) loading while allowing thermal expansion and contraction of the engine core 28. The aft connection may also be configured to resist torque (Mx) about the engine centerline C.

Figure 4:
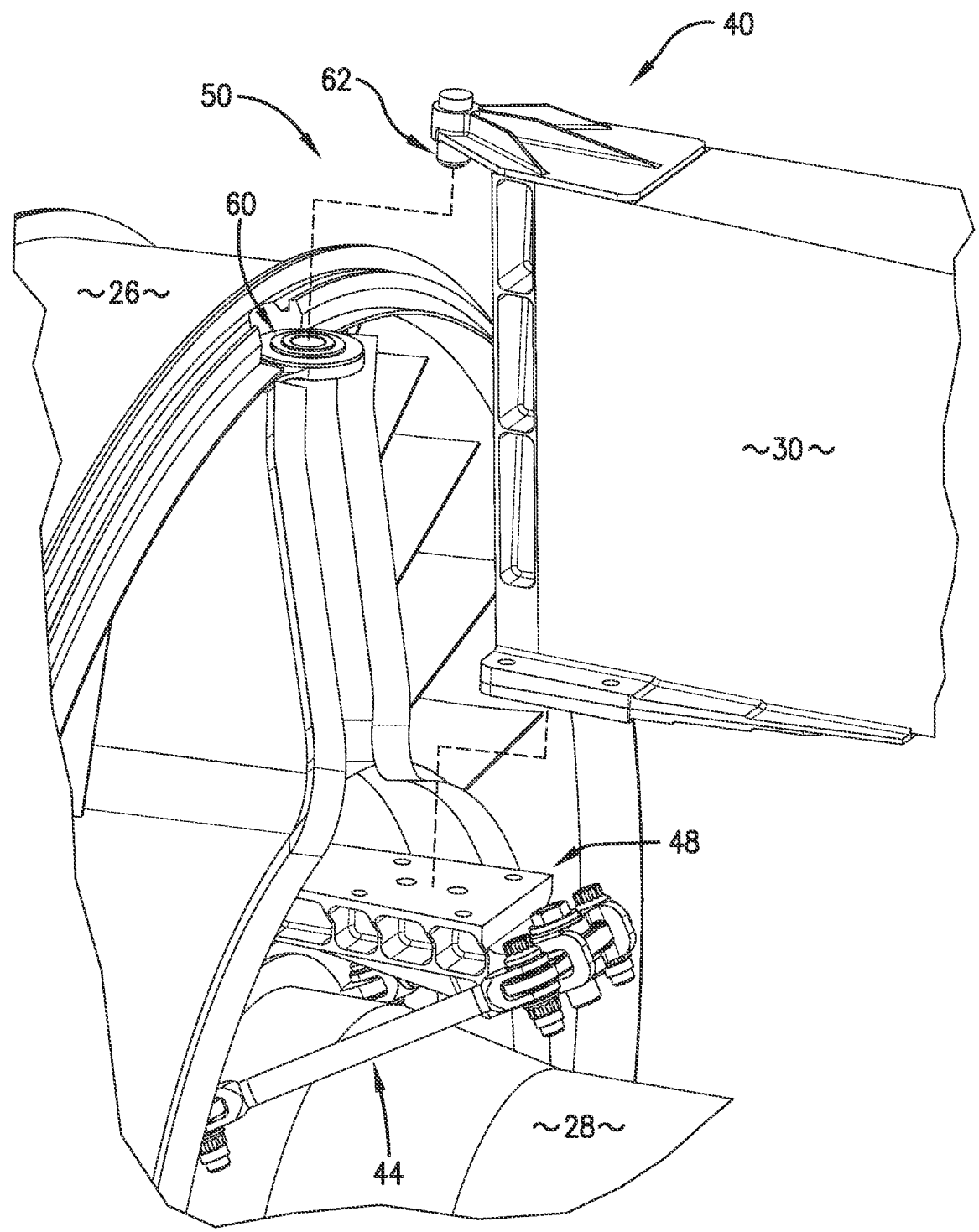
FIG. 4 is a fragmentary exploded isometric view of the forward engine mounting subsystem of FIG. 2A, showing the upper and lower forward mounting elements and lateral linkage element.
Figure 5:
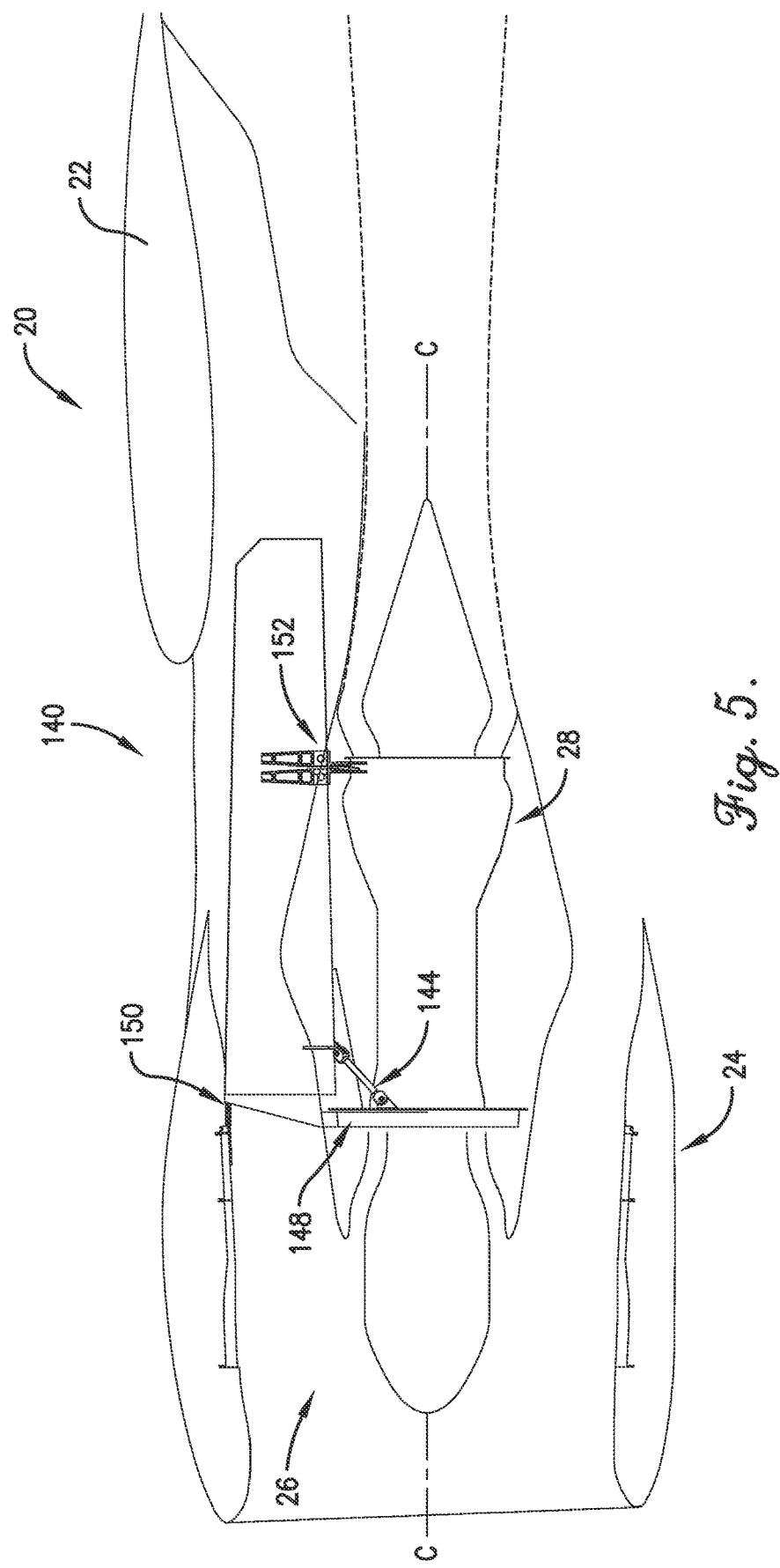
FIG. 5 is a cross-sectional side elevation view of a second embodiment of a mounting system for an engine of an aircraft or other aerospace vehicle.

As seen in FIG. 4, an implementation of the mounting system 40 may be configured to facilitate separating and re-attaching the engine 24, particularly the fan case and engine core assemblies 26,28, from the pylon 30. The lower forward element 48 may connect near a lower forward surface of the pylon 30 and the upper forward element 50 may separably engage with an engagement structure near an upper forward surface of the pylon 30. For example, the upper forward element 50 may include a spherical bearing 60 mounted on either the engine 24 (as shown) or the pylon 30 and a corresponding shear pin 62 mounted on the pylon 30 (as shown) or the engine 20, wherein the spherical bearing 60 slidably receives the shear pin 62. It will be appreciated that in this implementation, the slidable shear pin 62 will slide rather than resist forces along at least one axis (e.g., the z axis, as shown), but also that such sliding may accommodate thermal expansion due to engine operation.

Some or all of these connections may include fail-safe features, such as multiple alternate load-paths, pin-in-pin, or back-to-back fittings. In particular, the lower forward connection may include several such fail-safe features.

Portions of the fan case 26 and engine core 28 which engage the mounting elements 42,44,50,52 may be strengthened to accommodate the various connections and reactions of forces. Such strengthening may involve substantially any suitable material or design solution, such as any one or more of using a thicker material, using a stronger material, and/or incorporating structural features such as ribs or arms.

Referring to FIGS. 5-8, a second embodiment of the mounting system 140 may similarly include lateral linkage elements 144, lower and upper forward elements 148,150 and one or more aft elements 152, and may similarly provide reactions to applied loads. The linkage elements 144 may take the form of brace/thrust links extending between and link the pylon 30 and the lower forward element 148. The lower forward element 148 may include a lower forward connection with the engine core 28 and be configured to resist vertical (Fz) and lateral (Fy) loading and may include additional features to resist the thrust forces of the engine 24 and to prevent or limit side-to-side (yaw) deflections of the fan case 26 with respect to the engine core 28. The upper forward element 150 may provide an upper forward connection between the pylon 30 and the engine 24 and be configured to resist pitching moments (My) and engine torque (Mx). The upper forward element 150 may also be configured to allow for structure thermal expansion due to engine operation. Additionally, the upper forward connection may be integral to the pylon 30 or the upper forward connection may be made after the lower forward connection has been established. The aft element 152 may provide an aft connection between the pylon 30 and the engine core 28 and be configured to resist vertical (Fz) and lateral (Fy) loading while allowing thermal expansion and contraction of the engine core 28. The aft connection may also be configured to resist torque (Mx) about the engine centerline C. Some or all of these elements 144,148,150,152 may be integrated with respect to each other and/or with the pylon 30. Some or all of these connections may include fail-safe features, such as multiple alternate load-paths, pin-in-pin, or back-to-back fittings. In particular, the non-integral upper forward and aft connections 148,150 may include one or more such fail-safe features.

Figure 6:
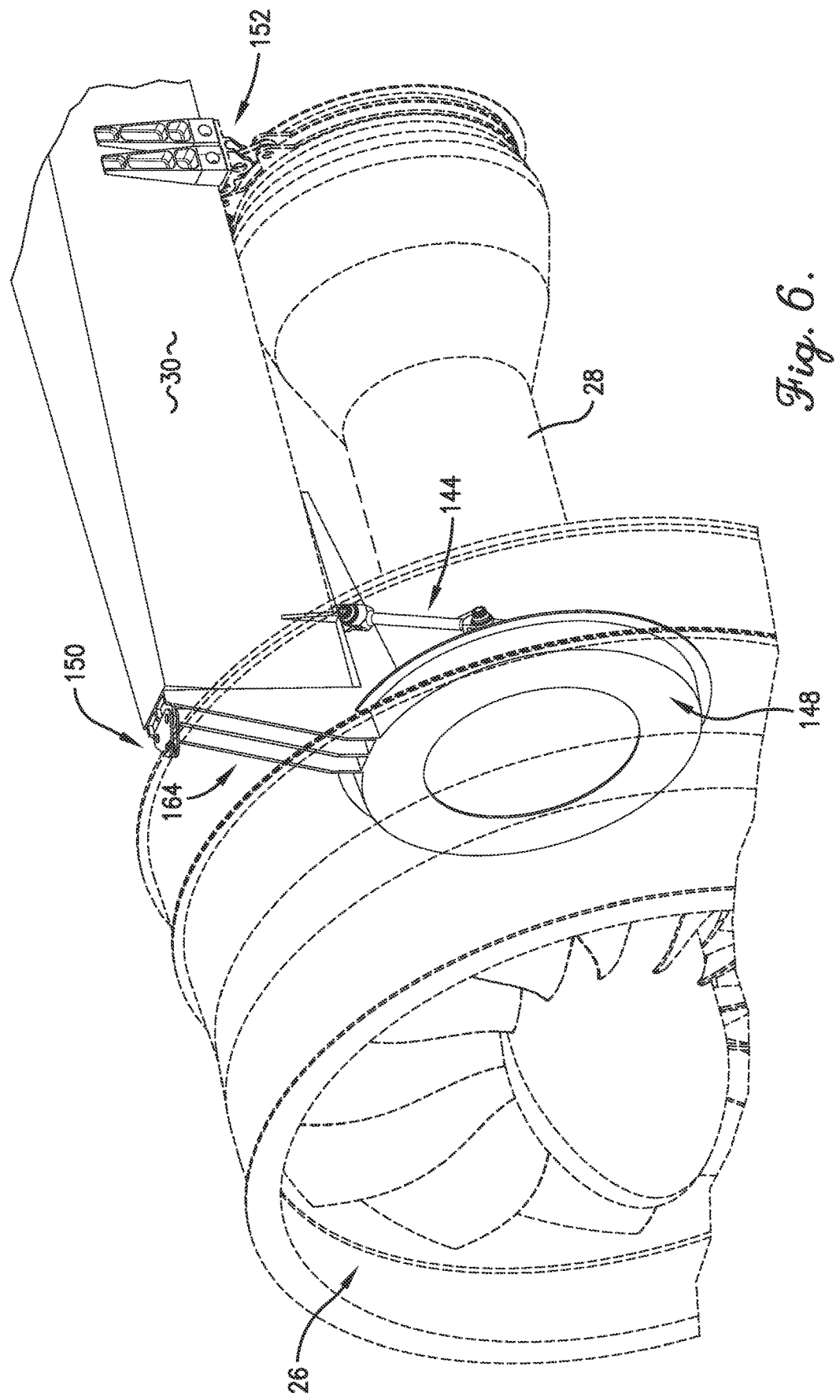
FIG. 6 is a fragmentary isometric view of the mounting system of FIG. 5, wherein a mounted engine is shown in broken line.
Figure 7:
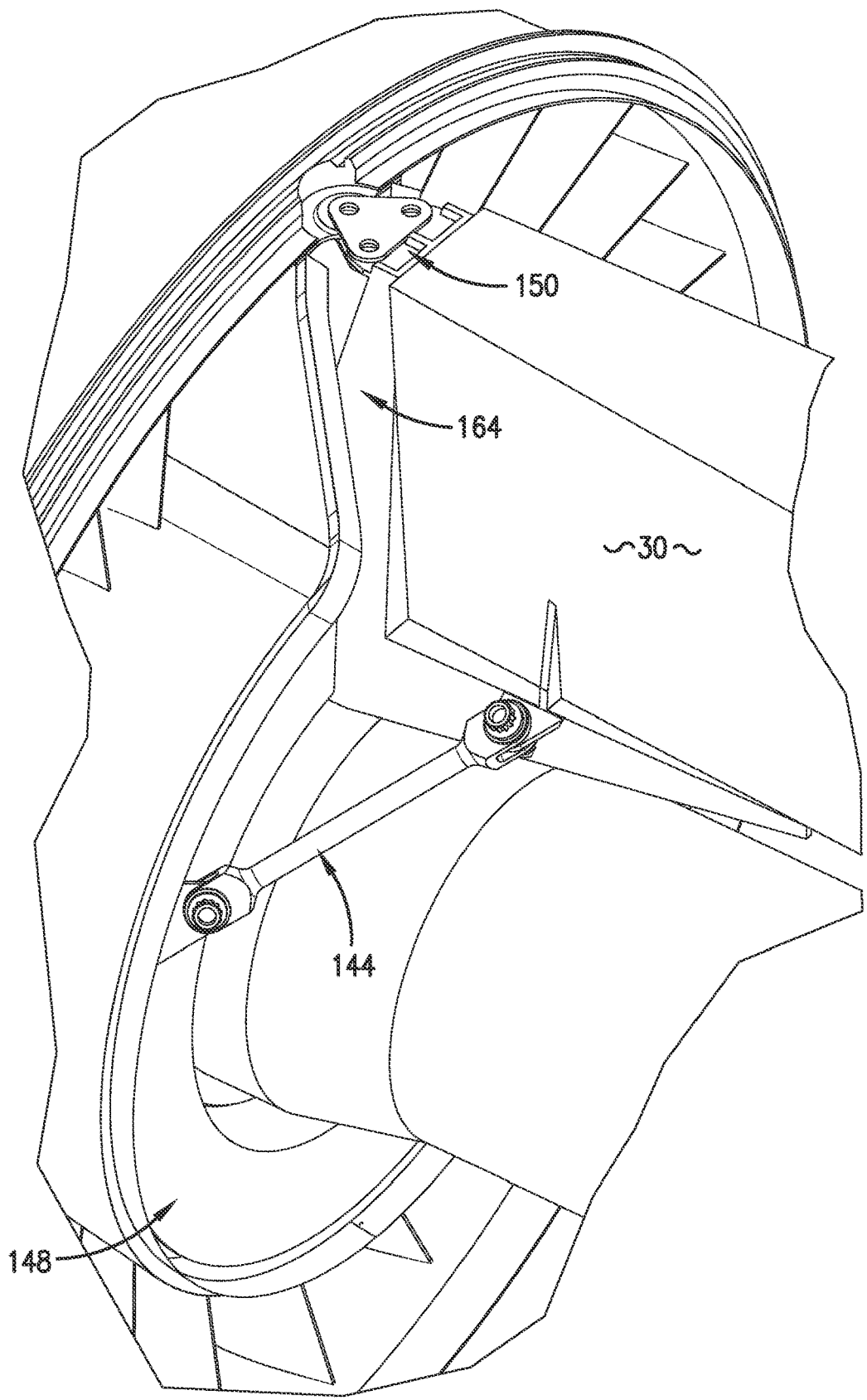
FIG. 7 is a fragmentary isometric view of a forward engine mounting subsystem of the system of FIG. 5, showing upper and lower forward mounting elements and a lateral linkage element.
Figure 8A:
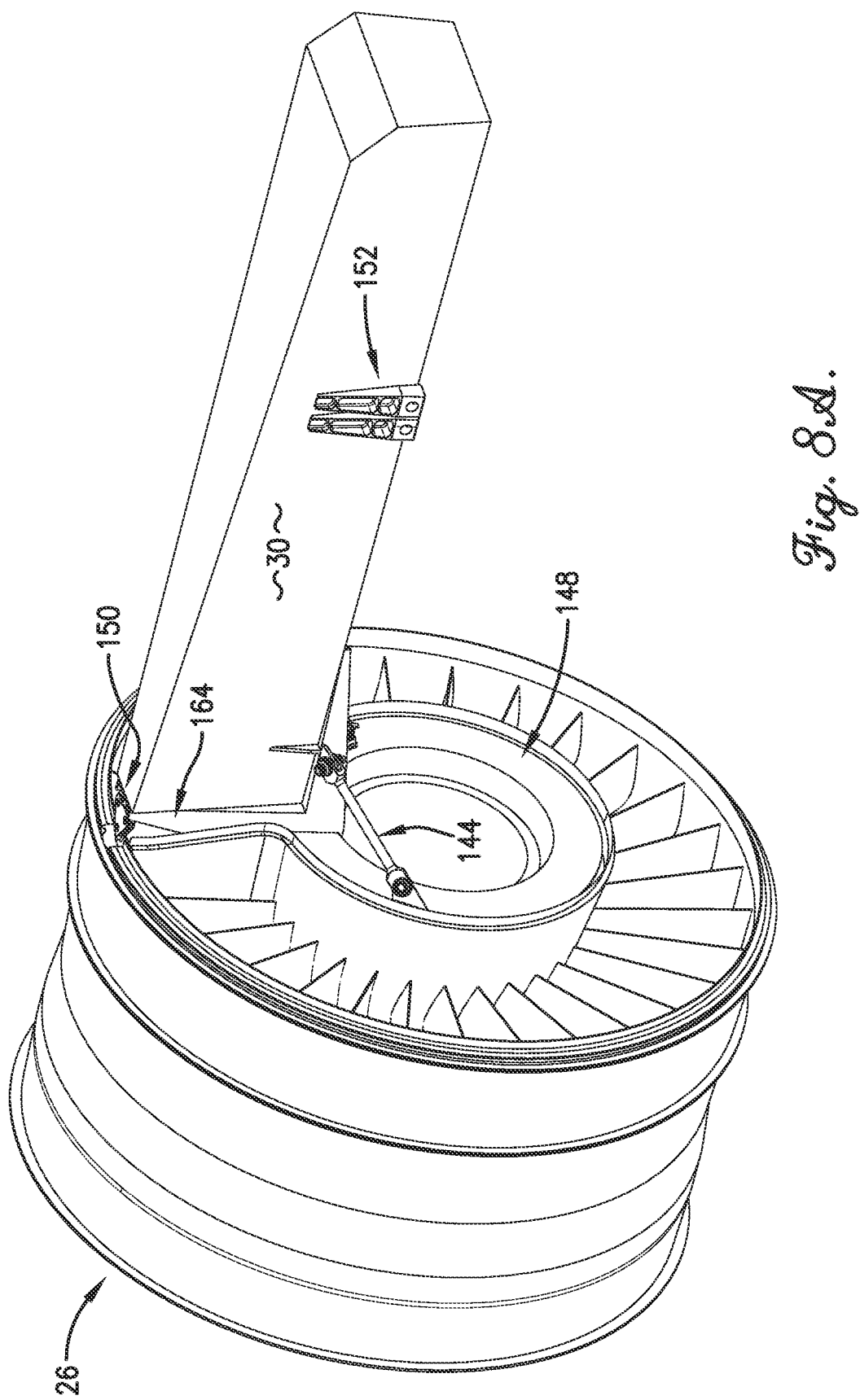
FIG. 8A is an isometric view of the mounting system of FIG. 5, showing a fan case assembly independently mounted without an engine core.
Figure 8B:
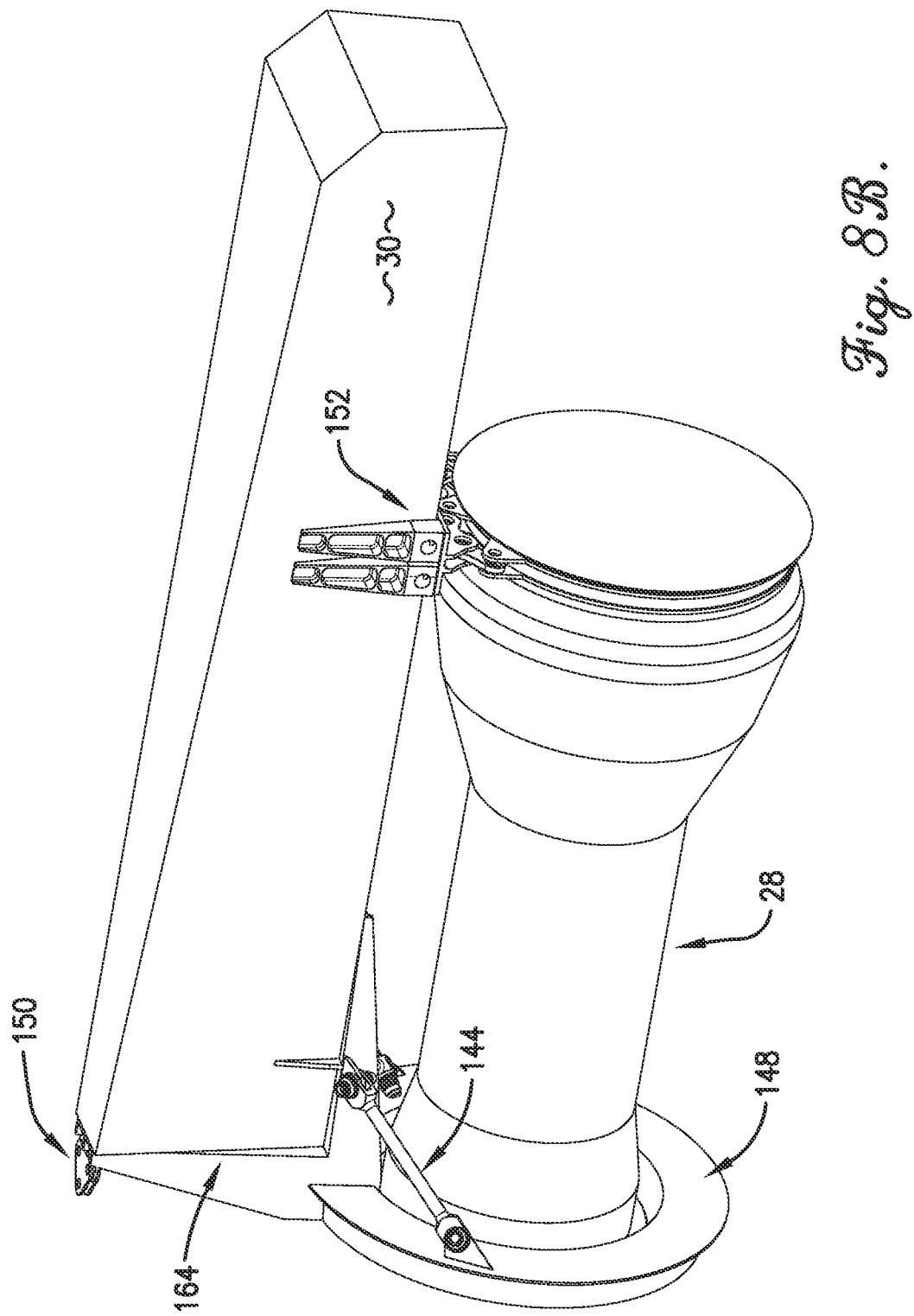
FIG. 8B is an isometric view of the mounting system of FIG. 5, showing the engine core independently mounted without the fan case assembly.

Referring also to FIG. 6, in one implementation, the lower forward element 148 may take the form of a ring which encircles and supports a forward end of the engine core 28 while also independently supporting the fan case 26, and which is integrally connected to the pylon 30 by an interconnect structure 164. The upper forward element 150 may separably connect (such as with bolts) with an engagement structure near an upper forward surface of the pylon 30. In one implementation, the upper forward element 150 may include a double plate connection with an upper portion of the fan case 26. The aft element 152 may separably connect (such as with bolts) a lower intermediate or rear surface of the pylon 30 and the engine core 28. As seen in FIGS. 8A and 8B, because the fan case 26 and the engine core 28 are independently supported, one can be removed without removing the other. Specifically, the fan case 26 can be removed without the engine core 28 by disconnecting the upper forward element 150, and the engine core 28 can be removed without the fan case 26 by disconnecting the aft element 152.

Figure 9:
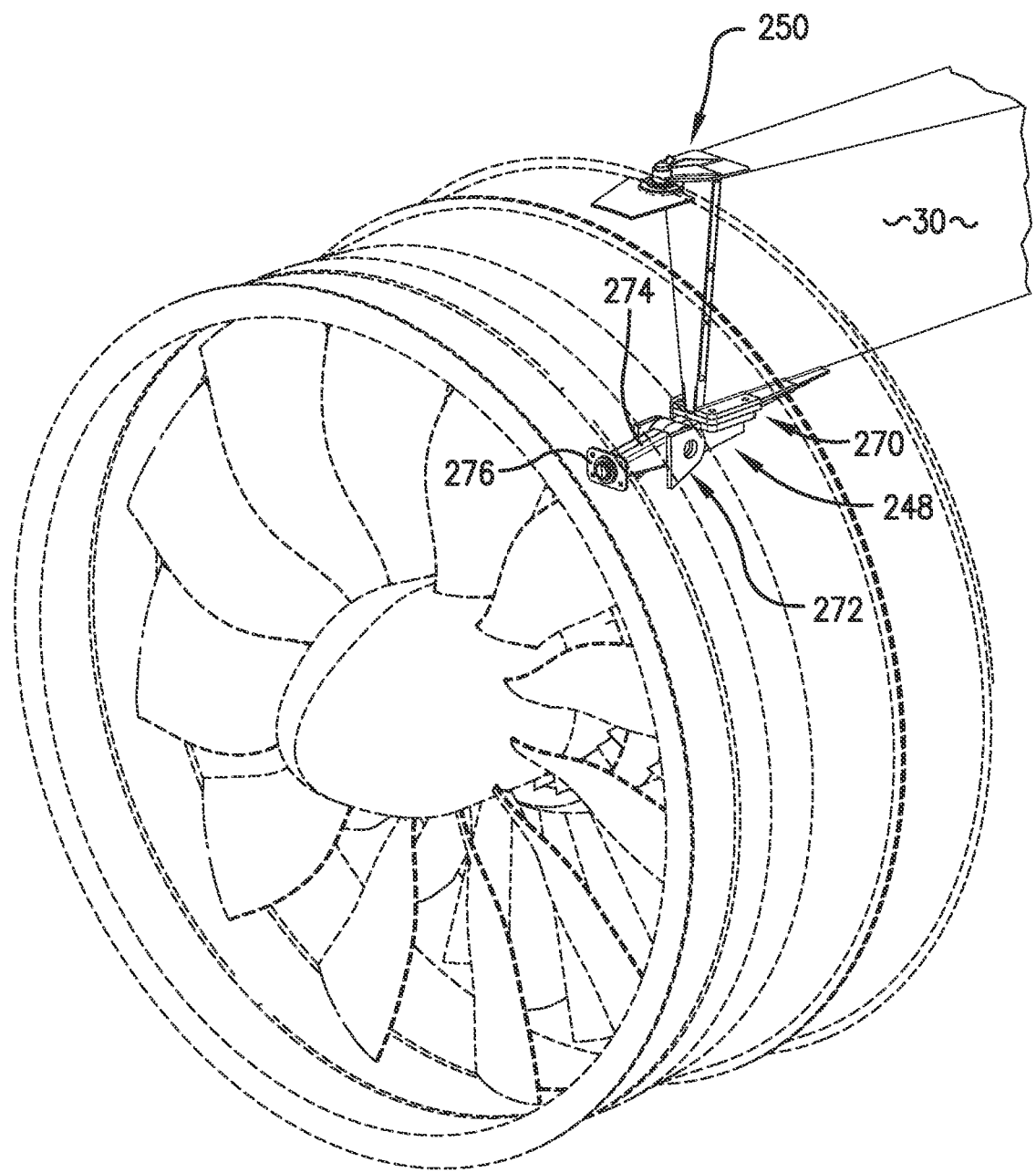
FIG. 9 is a fragmentary isometric view of a third embodiment of a mounting system for an engine of an aircraft or other aerospace vehicle, wherein a mounted engine is shown in broken line.
Figure 10:
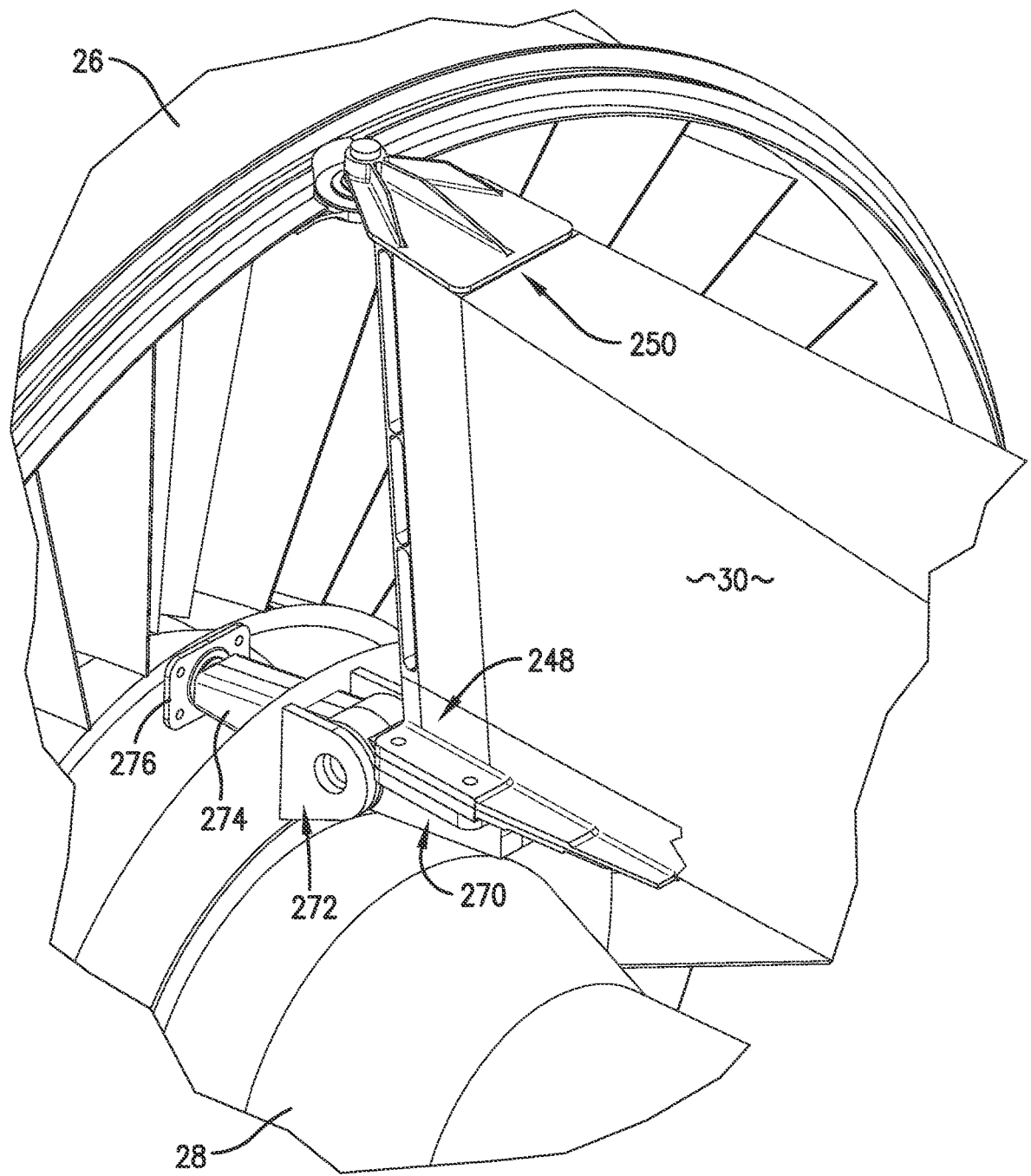
FIG. 10 is a fragmentary isometric view of a forward engine mounting subsystem of the system of FIG. 9, showing upper and lower forward mounting elements.
Figure 11:
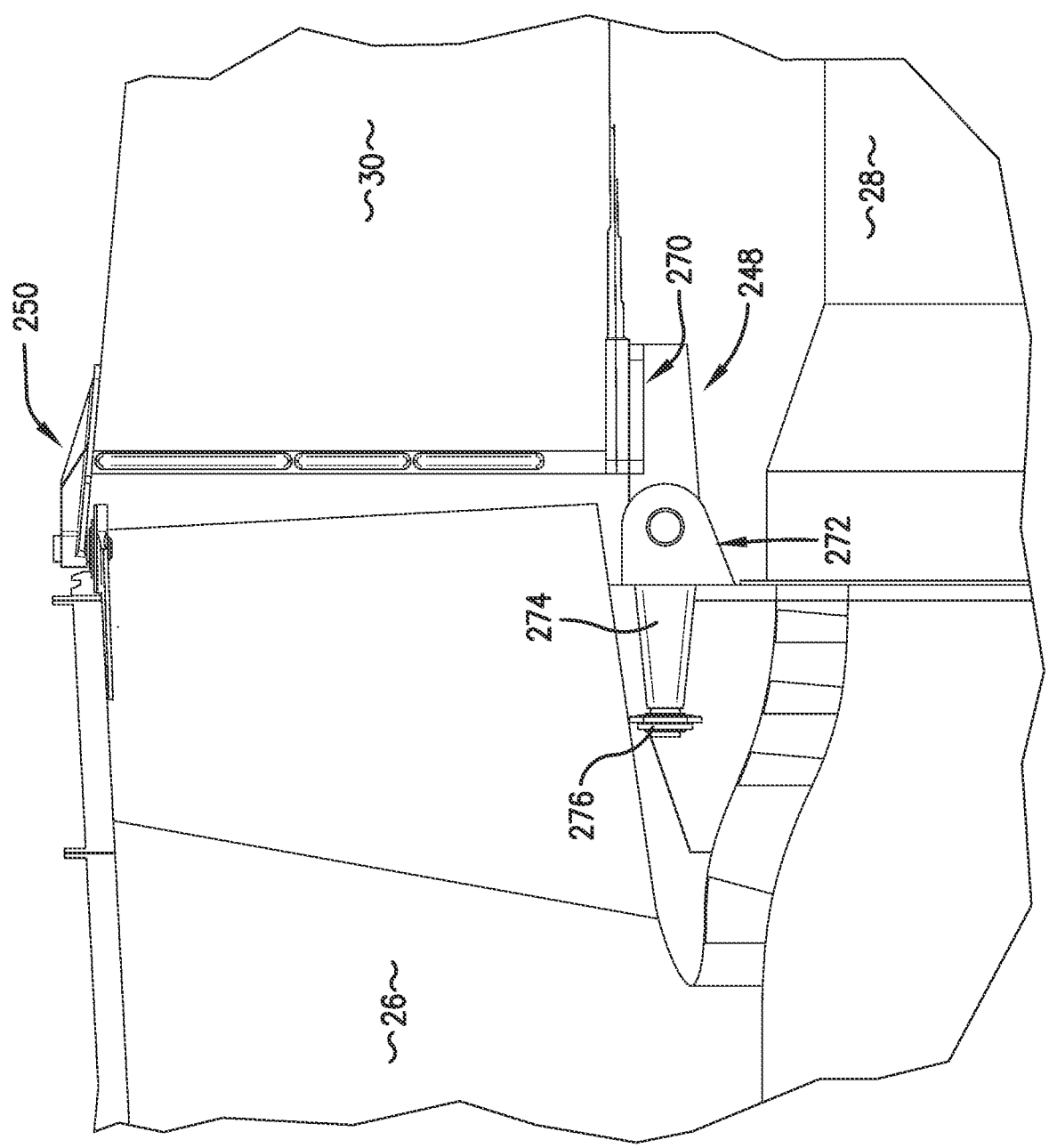
FIG. 11 is a fragmentary cross-sectional side elevation view of the forward engine mounting subsystem of FIG. 10.

Referring to FIGS. 9-11, a third embodiment of the mounting system may similarly include lower and upper forward elements 248,250 and one or more aft elements (not shown), and may similarly provide reactions to applied loads. The upper forward element 250 and the aft elements may be configured substantially as previously discussed. The lower forward element 248, while providing similar resultant reaction forces, may differ in that moments (Mz) about the vertical (z) axis are reacted by longitudinally-oriented spaced-apart connections within the fan case 26. In more detail, the lower forward element 248 may include a mount interface 270 separably connected (such as with bolts) with a lower forward surface of the pylon 30; one or more mounting lugs 272 connected to the fan case 26; a support beam 274 connected to the mount interface 270 and the mounting lugs 272 and extending into the fan case 26 having a forward interface 276 including a spherical bearing configured to movably engage the fan case 26. In one implementation, the support beam 274 may be located within the confines of the fan case 26, while in another implementation, the support beam 274 may be located above this location and reside within a splitter "12 o'clock" structure.

Thrust, longitudinal (x), and vertical forces may be reacted at the support beam 274. Moments about the y-axis (My) and x-axis (Mx) may be principally reacted by connections at the support beam 274 and the upper forward element 250. Side or lateral loads (Fy) may be reacted by the support lugs 272 or by a substantially laterally-oriented link connecting the support beam 274 to the fan case 26. Additionally, known solutions for constraining lateral movement of the support beam 274 along the axis of the support lugs 272 may also be employed.

Figure 12:
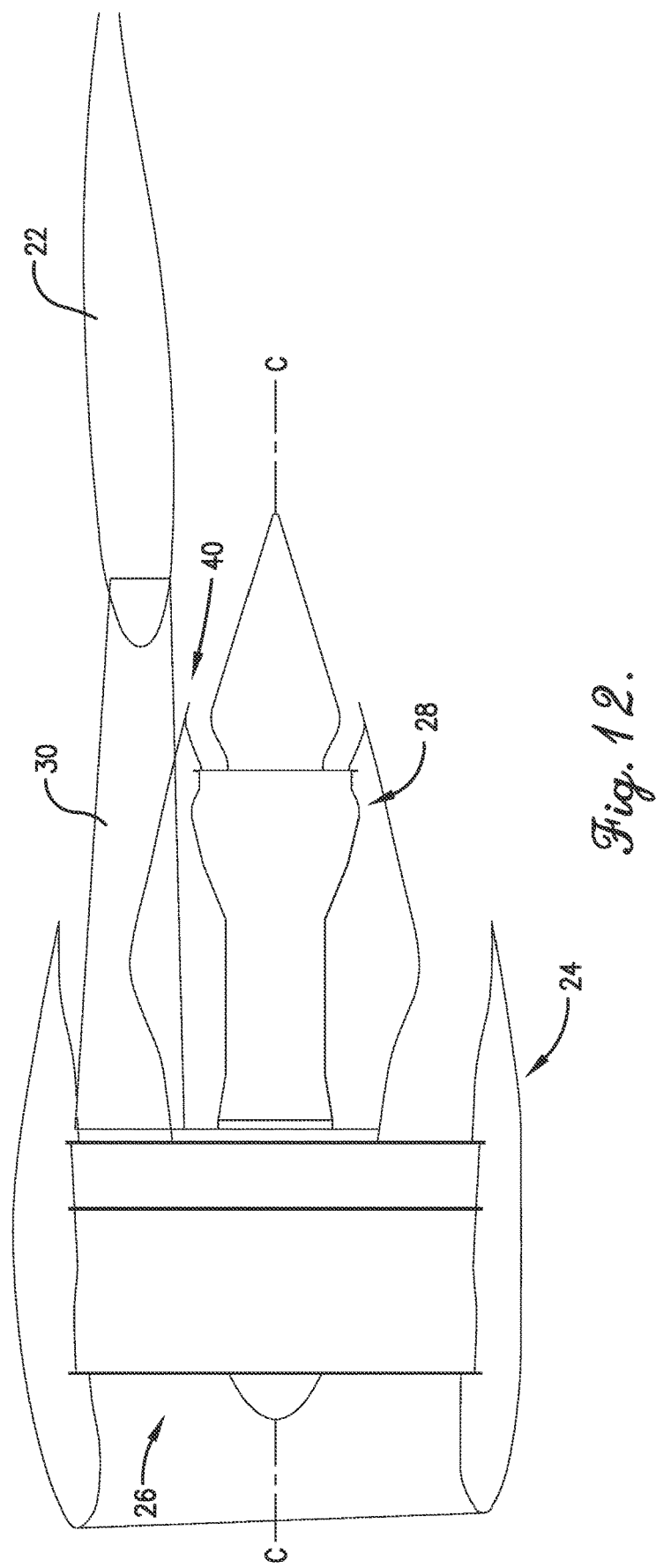
FIG. 12 is a side elevation view of the mounting system adapted to couple the engine with the aircraft or other aerospace vehicle forward of and below a wing or other support structure.
Figure 13:
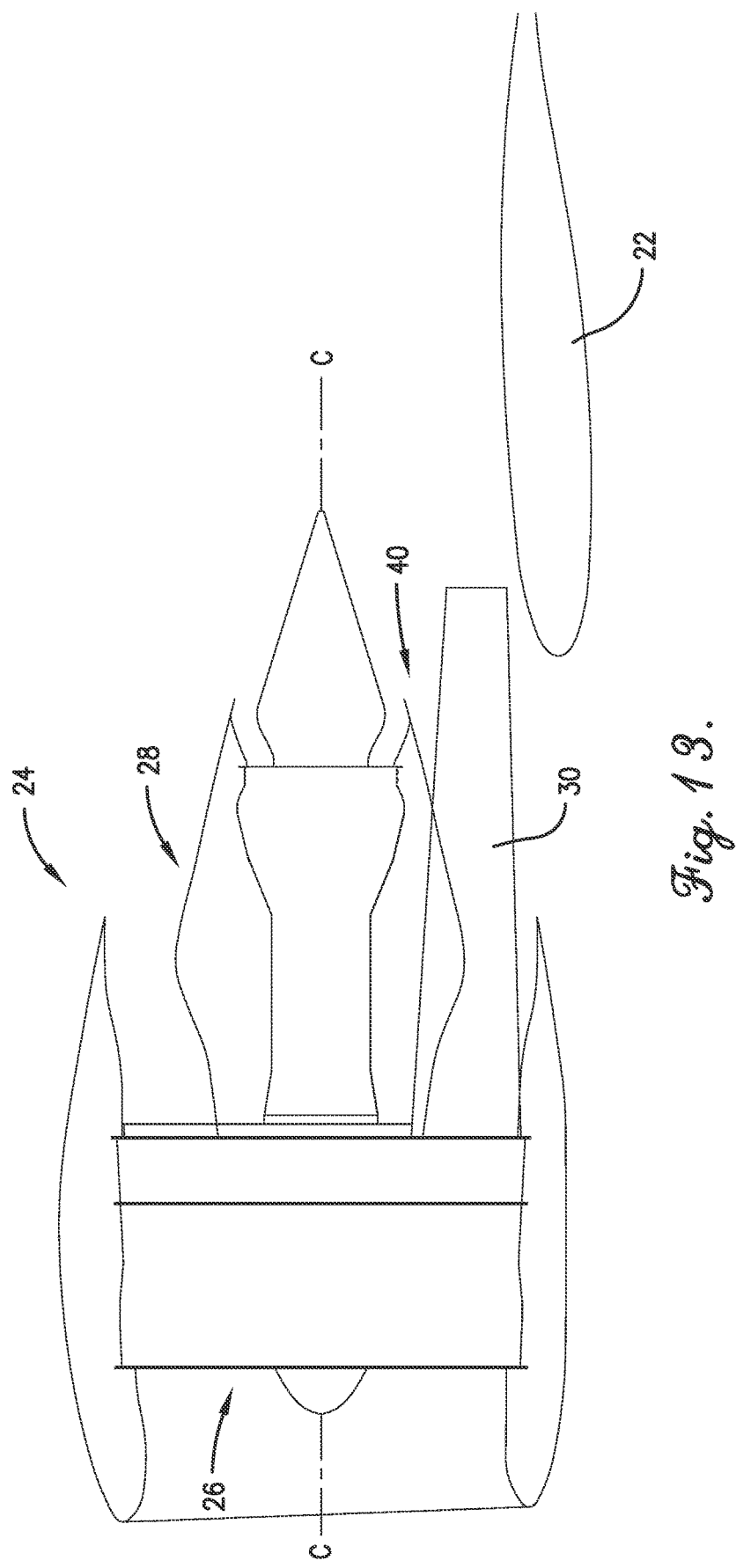
FIG. 13 is a side elevation view of the mounting system adapted to couple the engine with the aircraft or other aerospace vehicle forward of and above the wing or other support structure.

The above-described embodiments are examples of how the mounting technology of the present invention may be implemented as desired or needed for particular application. It will be appreciated that additional and/or alternative embodiments and implementations are also possible. For example, referring to FIG. 12, the engine mounting system 40 may be independent of the pylon 30 between the engine 24 and the airframe 22. The pylon configuration, length, and integration with the airframe 22 may be adapted as desired or needed. Referring to FIGS. 13 and 14, the engine 24 and associated nacelle may be supported substantially from below the engine centerline axis C in an inverted installation, ahead of or behind the wing 22. In such an inverted installation, the terminology may change in that "upper" and "lower" may be reversed. Further, "lower" may be referred to as "core" (engine reference), and "upper" may be referred to as "fan case".

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A mounting system for mounting an engine on an aerospace vehicle, the engine comprising a fan case, having an outer portion and an outer periphery, and an engine core arranged along a centerline axis, the mounting system comprising:
   a pylon;
   a lower forward element to couple a forward portion of the engine core with a lower forward portion of the pylon;
   one or more lateral linkages extending from the lower forward element to extend laterally between the lower forward element and the forward portion of the engine core;
   an upper forward element spaced laterally apart from the lower forward element, extending from an upper portion of the pylon to couple the outer portion of the fan case with an upper portion of the pylon; and
   an aft element spaced aftwardly apart from the lower and upper forward elements, extending from an aft portion of the pylon to couple an aft portion of the engine core to an aft portion of the pylon,
   wherein the pylon, the lower forward element, the one or more lateral linkages, the upper forward element, and the aft element do not extend vertically beyond the outer periphery of the fan case when coupled to the engine.

2. The mounting system of claim 1, wherein the aerospace vehicle is an aircraft, and wherein the engine is a turbofan engine mounted below a wing of the aircraft.

3. The mounting system of claim 1, the lower forward element resisting a vertical loading (Fz), a lateral loading (Fy), and a thrust force (Fx) during operation of the engine, and limiting a side-to-side (yaw) deflection of the fan case with respect to the engine core during operation of the engine.

4. The mounting system of claim 1, the one or more lateral linkages limiting a deflection about a vertical axis (z) of the fan case during operation of the engine.

5. The mounting system of claim 1, the upper forward element resisting a pitching moment (My) and an engine torque (Mx) and accommodating a thermal expansion during operation of the engine.

6. The mounting system of claim 1, the aft element resisting a vertical loading (Fz), a lateral loading (Fy), and a torque (Mx) and accommodating a thermal expansion during operation of the engine.

7. The mounting system of claim 1, the upper forward element comprising a spherical bearing and a shear pin slidably received within the spherical bearing.

8. The mounting system of claim 1, the lower forward element comprising a ring structure encircling the forward portion of the engine core and supporting the fan case and the engine core, wherein the ring structure independently supports the fan case and the engine core such that one of the fan case or the engine core is removable without removing the other.

9. The mounting system of claim 1, the lower forward element resisting an engine torque (Mx) during operation of the engine.

10. The mounting system of claim 1, the fan case including one or more mounting lugs, and the lower forward element including a support beam connected to the one or more mounting lugs and having a forward interface including a spherical bearing movably engaging the fan case, with the one or more mounting lugs resisting a lateral loading (Fy), and the support beam resisting a vertical loading (Fz), an engine torque (Mx), and a thrust force during operation of the engine.

11. A mounting system for mounting an engine on an aerospace vehicle, the engine comprising a fan case, having an outer portion and an outer periphery, and an engine core arranged along a centerline axis, the mounting system comprising:
   a pylon;
   a lower forward element to couple a forward portion of the engine core with a lower forward portion of the pylon, and comprising a ring structure encircling the forward portion of the engine core to support the fan case and the engine core, wherein when the ring structure is attached to independently support the fan case and the engine core, one of the fan case or the engine core is removable without removing the other, with the lower forward element resisting an engine torque (Mx) during operation of the engine;
   one or more lateral linkages extending from the lower forward element to extend laterally between the lower forward element and the forward portion of the engine core, with the one or more lateral linkages limiting side-to-side (yaw) deflections of the fan case with respect to the engine core during operation of the engine;
   an upper forward element spaced laterally apart from the lower forward element, extending from an upper portion of the pylon to couple the outer portion of the fan case with the upper portion of the pylon;
   an aft element spaced aftwardly apart from the lower and upper forward elements, extending from an aft portion of the pylon to couple an aft portion of the engine core to the aft portion of the pylon, and
   an interconnect structure extending from the lower forward element to the upper forward element and extending along a forward surface of the pylon,
   wherein the pylon, the lower forward element, the one or more lateral linkages, the upper forward element, and the aft element do not extend vertically beyond the outer periphery of the fan case when coupled to the engine.

12. The mounting system of claim 11, the lower forward element resisting a vertical loading (Fz), a lateral loading (Fy), and a thrust force (Fx) during operation of the engine, and limiting a side-to-side (yaw) deflection of the fan case with respect to the engine core during operation of the engine, and the one or more lateral linkages limiting a deflection about a vertical axis (z) of the fan case and resist a thrust force (Fx) during operation of the engine.

13. The mounting system of claim 11, the upper forward element resisting a pitching moment (My) and an engine torque (Mx) and accommodating a thermal expansion during operation of the engine.

14. The mounting system of claim 11, the aft element resisting a vertical loading (Fz), a lateral loading (Fy), and a torque (Mx) and accommodating a thermal expansion during operation of the engine.

15. The mounting system of claim 11, wherein the lower forward element comprises a ledge extending below the pylon and abutting a lower forward surface of the pylon.

16. A mounting system for mounting an engine on an aerospace vehicle, the engine comprising a fan case, having one or more mounting lugs, an outer portion, and an outer periphery, and an engine core arranged along a centerline axis, the mounting system comprising:
   a pylon;
   a lower forward element to couple a forward portion of the engine core with a lower forward portion of the pylon, and including a support beam to connect to the one or more mounting lugs of the fan case and having a forward interface including a spherical bearing to movably engage the fan case, with the one or more mounting lugs resisting a lateral loading (Fy), and the support beam resisting a vertical loading (Fz), an engine torque (Mx), and a thrust force during operation of the engine, wherein the lower forward element comprises a ledge extending below the pylon and abutting a lower forward surface of the pylon;
   one or more lateral linkages extending from the lower forward element to extend laterally between the lower forward element and the forward portion of the engine core;
   an upper forward element spaced laterally apart from the lower forward element, extending from an upper portion of the pylon to couple the outer portion of the fan case with the upper portion of the pylon;
   an aft element spaced aftwardly apart from the lower and upper forward elements, extending from an aft portion of the pylon to couple an aft portion of the engine core to the aft portion of the pylon; and
   an interconnect structure extending from the lower forward element to the upper forward element and extending along a forward surface of the pylon,
   wherein the pylon, the lower forward element, the one or more lateral linkages, the upper forward element, and the aft element do not extend vertically above the outer periphery of the fan case when coupled to the engine.

17. The mounting system of claim 16, the lower forward element resisting a vertical loading (Fz), a lateral loading (Fy), and a thrust force (Fx) during operation of the engine, and limiting a side-to-side (yaw) deflection of the fan case with respect to the engine core during operation of the engine, and the one or more lateral linkages limiting a deflection about a vertical axis (z) of the fan case during operation of the engine.

18. The mounting system of claim 16, the upper forward element resisting a pitching moment (My) and an engine torque (Mx) and accommodating a thermal expansion during operation of the engine.

19. The mounting system of claim 16, the aft element resisting a vertical loading (Fz), a lateral loading (Fy), and a torque (Mx) and accommodating a thermal expansion during operation of the engine.

20. The mounting system of claim 16, the upper forward element comprising a spherical bearing and a shear pin slidably received within the spherical bearing.

* * * * *